TELEVISION SYSTEM HAVING REDUCED TRANSMISSION BANDWIDTH

Filed Dec. 30, 1949 3 Sheets-Sheet 1

INVENTOR
R. E. GRAHAM
BY Hugh S. Wertz
ATTORNEY

INVENTOR
R. E. GRAHAM
BY Hugh S. Wertz
ATTORNEY

TELEVISION SYSTEM HAVING REDUCED TRANSMISSION BANDWIDTH

Filed Dec. 30, 1949 3 Sheets-Sheet 3

INVENTOR
R. E. GRAHAM
BY Hugh S. Wertz
ATTORNEY

Patented Feb. 17, 1953

2,629,010

UNITED STATES PATENT OFFICE 2,629,010

TELEVISION SYSTEM HAVING REDUCED TRANSMISSION BANDWIDTH

Robert E. Graham, Morristown, N. J., assignor to Bell Telephone Laboratories, Incorporated, New York, N. Y., a corporation of New York Application December 30, 1949, Serial No. 136,105

9 Claims. (Cl. 178—6.8)

This invention relates to the translation, transmission, reception and reproduction of electric communication signals, particularly television image signals and the like.

The principal object of the invention is to effect a substantial reduction in the width of the frequency band required for the transmission of such signals as compared with the band width required when the transmission is effected by the apparatus and in accordance with the methods commonly in use.

Other objects are to provide apparatus and methods for accomplishing this principal object.

The frequency band width required for the transmission of satisfactory television images depends both upon the properties of the eye and upon the departures from perfection which the observer regards as tolerable. Present television systems take advantage of the finite acuity demands of the eye, and to a certain extent, of the "persistence of vision" or storage properties of the visual process.

Another way in which the observer may profitably be imposed upon is to make use of the fact that he requires less sharpness in the portrayal of moving objects than in that of stationary ones. Apparently, this lessened requirement stems not only from reduced eye acuity for a moving abject, but also from an increased willingness to tolerate blurring under this condition.

This phenomenon has not, so far as applicant is aware, been taken advantage of by any of the present systems of reducing the frequency band width of television transmission. In accordance with the present invention and in furtherance of its broad object, this phenomenon is, however, utilized and this is done by discarding a major portion of the fine detail video information (i. e., the part associated with vertical lines or edges) for a moving object, the resultant lack of precision being nevertheless acceptable to the eye.

This can be done, for example, by first splitting the video signal into two transmission paths containing complementary low-pass and high-pass filters, so that the fine detail video information is separated from the "coarse" video information. The low-pass signal is transmitted in the usual manner, but the high-pass signal is transmitted through a storage tube, the pick-up beam of which is moved in the same geometrical pattern or raster as the recording beam, but at a much lower repetition rate than the recording beam, so that a certain fraction of the fine detail signal is discarded, said fraction of discarded signal being $$\frac{n-n_1}{n}$$

where $n$ is the repetition rate of the recording beam and $n_1$ is the repetition rate of the pick-up beam.

An alternative method of dividing the picture into coarse and fine components, also in accordance with the invention, is through the use of image dissector camera tubes as video pickups, the apertures of these dissectors being so arranged that one tube picks up only fine detail, while the other picks up the coarse signal. The separation of the signals having thus been effected, the remainder of the system can be identical with that mentioned in regard to the above-described system employing electrical filters for separation.

It is to be noted that in the system wherein the electrical filters operate on a conventional video signal, only the detail variations in the horizontal direction are divided into coarse and fine components, whereas in accordance with the dual scanning aperture camera tube version of the invention, the coarse and fine components can be separated out along any direction in the original picture.

At the receiving point, the fine detail signal undergoes a converse storage tube operation to restore the rate of repetition and it is then recombined with the coarse component signal to form a complete video signal once more, which signal is identical with the horizontal signal when there is no motion in the televised scene.

When there is motion in the pictorial subject, the discarded information causes a lack of register between the coarse and the fine structure associated with vertical lines or edges. This occurs because the low frequency picture content is brought up to date more frequently than the high frequency components. Hence, in accordance with one embodiment of the invention, an automatic gain control of the fine detail signal is provided at the receiver, this gain control being a function of the difference in amplitude between the low frequency signal and a version of itself delayed by one frame time, which difference in amplitude is, of course, an index of the extent of motion in the pictorial subject.

In accordance with the invention in all its embodiments, in order to effect an improvement in the fidelity of visual reproduction, there may be further provided means for causing a certain amount of time delay in the coarse signal path to match the average time delay in the fine signal path due to the storage processes.

The invention will be more fully understood from the following detailed description of certain illustrative embodiments thereof taken in connection with the appended drawings, in which.

Figure 4:
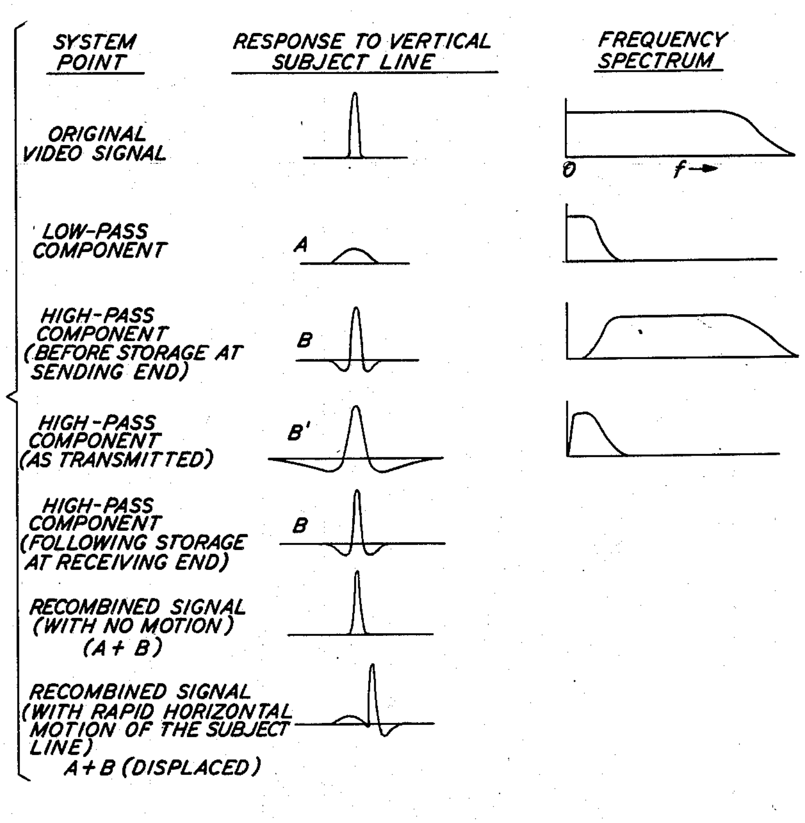
Figure 5:
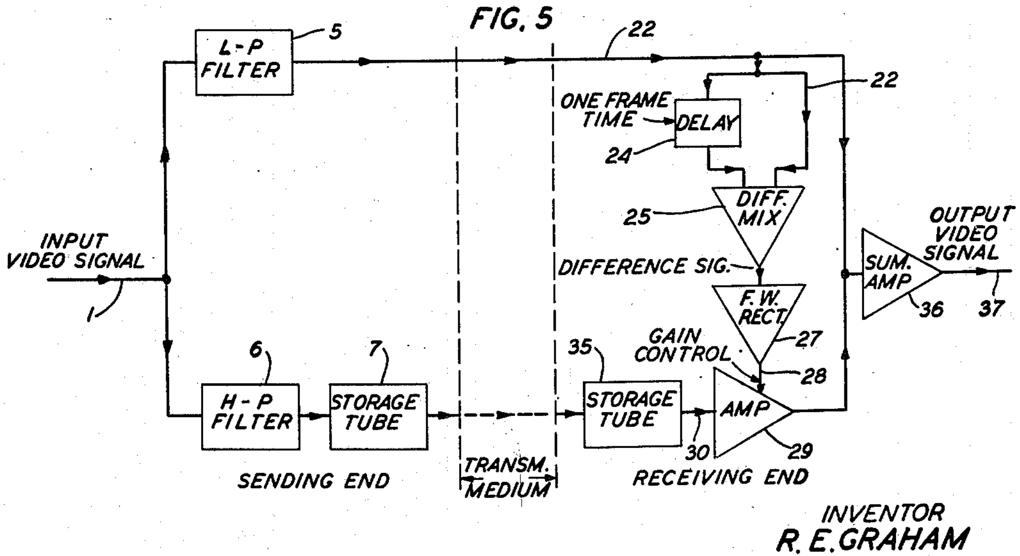
Figure 6:
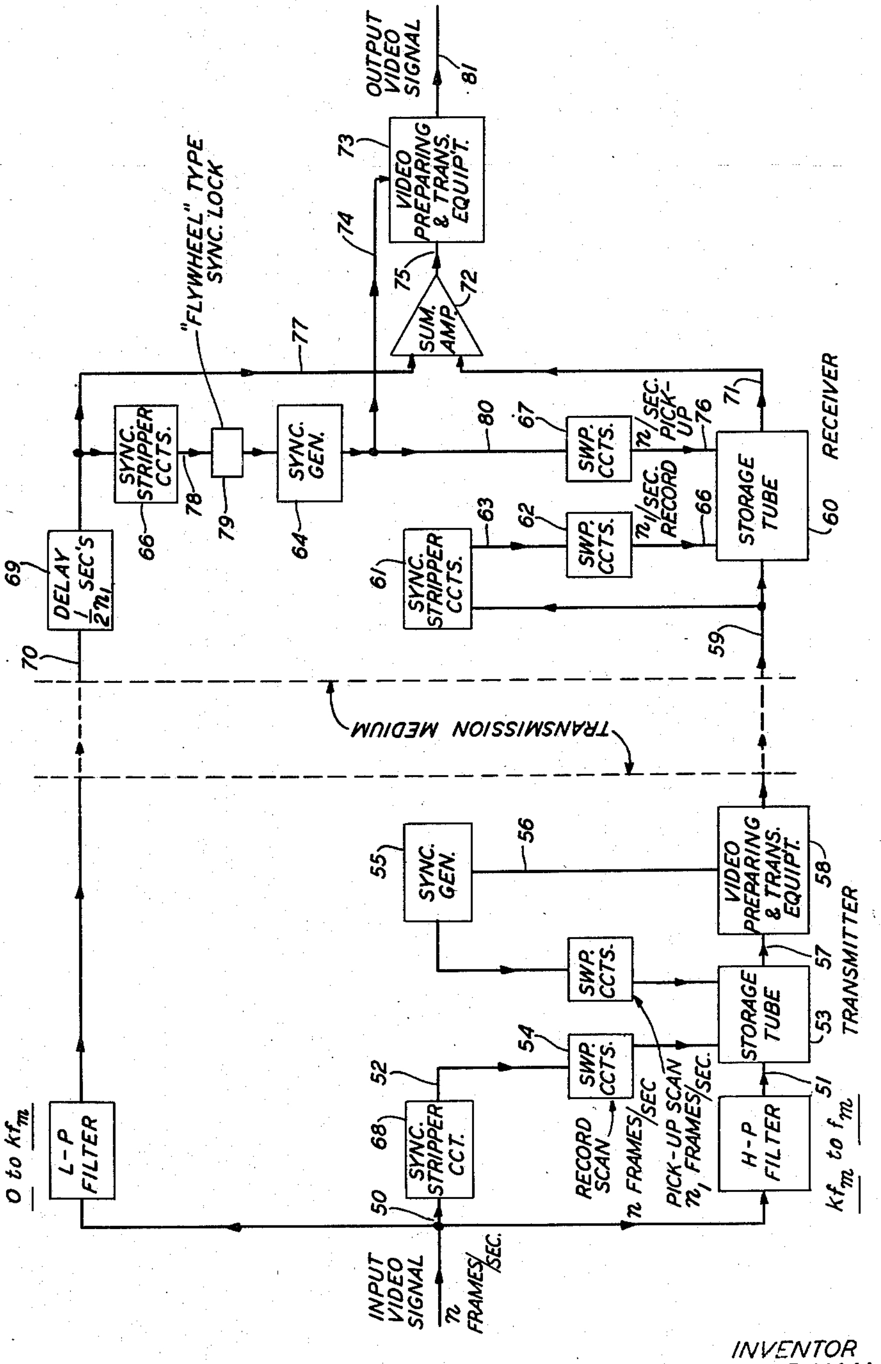

Fig. 4 consists of a series of plots indicating the responses of various parts of the system to a narrow vertical subject line;

Fig. 5 is an over-all block diagram of an exemplary embodiment of the reduced band-width system employing an automatic gain control of the fine detail components; and Fig. 6 is an over-all block diagram of an exemplary embodiment of the reduced band-width system employing a delaying means in the coarse signal path.

Figure 1:
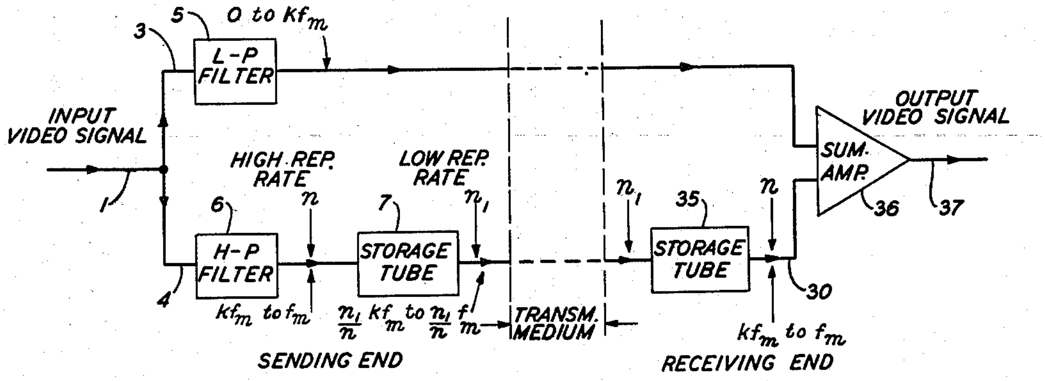
Fig. 1 is an over-all block diagram of an exemplary embodiment of the reduced band-width system.
Figure 2:
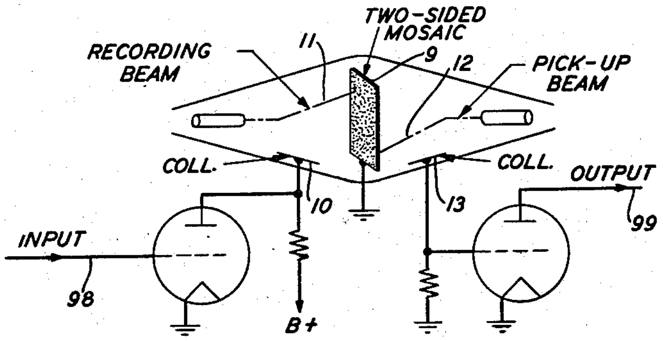
Fig. 2 shows schematically a representative type of storage tube which can be used in the practice of the invention.

In accordance with the invention, one simple and convenient embodiment is that shown in Fig. 1. As there indicated, a conventionally generated video signal 1 is split into two transmission paths 3 and 4 containing complementary low-pass and high-pass filters 5 and 6. In a specimen arrangement, the transmission band of the low-pass filter 5 can extend from zero frequency to approximately 10 per cent of the normal top video frequency; while that of the high-pass filter may start at about 10 per cent of the normal maximum frequency. The signal from the low-pass filter is transmitted directly in accordance with standard practice, but the high-pass signal is first recorded on the mosaic of a storage tube 7. The details of one such general type of tube, which has been discussed in the literature (see, e. g., Zworykin and Morton, Television (1940), page 326 et seq.), are shown in Fig. 2.

This tube has a two-sided mosaic consisting of an array of particles imbedded in but insulated from a grounded conductive plate 9 in such a way as to be accessible to scanning electron beams on either side. The electrical properties are such as to yield a secondary emission ratio appreciably greater than unity upon bombardment by the recording beam. The high-pass signal voltage is applied to the recording collector electrode 10, while a constant strength recording beam 11 is scanned repeatedly over the mosaic in synchronism with the original picture scan. Then, if the beam current is sufficiently high, the potential of the group of particles bombarded by the beam at any given instant is related directly to the instantaneous collector potential, e. g., slightly positive with respect thereto. Thus, a complete charge "image" corresponding to the original picture is stored on the mosaic by each frame scan. It is to be noted that this process requires no separate erasing operation, since the recording beam drives each particle up or down to the proper potential at each passage.

The pick-up beam 12 is scanned over the other side of the mosaic in the same geometric pattern or raster as the recording scan, but at a much lower repetition rate, which, to choose an illustrative value, can be one-tenth of the recording rate. Pick-up beam current is assumed to be sufficiently low so that no appreciable discharging of the mosaic signal is caused by this scan. Then the current to the pick-up collector 13 at any given instant is proportional to the potential of the group of particles under the monitoring beam, and the outgoing collector signal 99 is thus a slowly repeated version of the original by-pass video signal 98.

It can readily be shown that for the above-described arrangement, employing the values indicated, the band-width required to transmit this high-pass signal is about one-tenth of the normal video band. The low-pass signal requires a similar band width, so that the total required channel width is about one-fifth the normal requirement.

Figure 3:
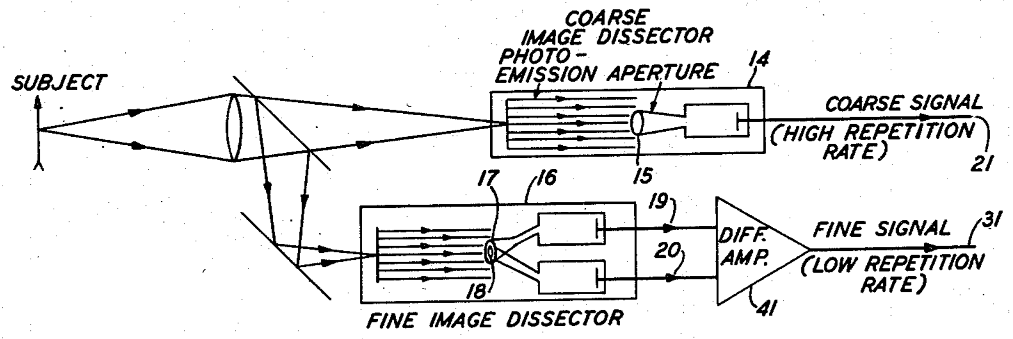
Fig. 3 illustrates a camera tube arrangement for separating the fine components from the coarse.

In accordance with another specific embodiment of the invention, the picture is divided into coarse and fine components by the use of the system illustrated in Fig. 3. This requires two image-dissector tubes upon which the subject picture is projected. One is a conventional dissector 14 having an aperture diameter 15 several times greater than that of a normal tube of this type. The other dissector 16 has two concentric apertures 17 and 18, each feeding its own electron multiplier. The larger 17 of the two apertures has the same diameter as the aperture 15 in the first tube 14, while the smaller 18 of the two is of the size normally employed for the given system. The outputs 19 and 20 derived from these two apertures are combined differentially, in amplifier 41, with the relative gains of the two paths so adjusted that the net output is zero when the density of the electron image is constant over the dual-aperture area.

In the "coarse" dissector 14, the electron image is scanned over the aperture with the normal frame repetition rate and number of scanning lines, but the aperture height, which, as stated before, is abnormally large, is several times the scanning line pitch. Thus, the output 21 of this tube represents the coarse detail of the picture. In the "fine" dissector 16, the electron image is scanned over the apertures 17 and 18 at the normal number of scanning lines per frame, but at a much lower repetition rate. The resulting output signal 31 is the same as that produced by scanning the picture with a "high-pass" aperture. That is, sinusoidal brightness distributions having, e. g., fewer than 50 wavelengths per picture height do not produce an output signal, while finer pitch variations (up to, for example, 500 wavelengths per picture height) are transmitted. It can readily be shown that the channel width required to transmit the coarse signal in the example chosen is about one-tenth of the normal video band width, while by suitable choice of the reduced repetition rate, the signal from the fine dissector can be made to require a similar channel, the total band width for the two signals thus being one-fifth of normal, just as in the electrical filter embodiment of the invention.

In a copending application of the present inventor, Serial No. 136,107, filed December 30, 1949, there are disclosed a number of exemplary image dissector tube arrangements which effectively separate the video information into signals representative respectively of fine and coarse detail components.

The operations at the receiving point are the same whether the coarse and fine fields are separated by electrical filters or by differently apertured camera tubes. At that point, the modified (i. e., having a reduced repetition rate) fine structure signal is stored in a tube 35 similar to the one used at the transmitting point, but the recording scan is now carried out at the low repetition rate and the pick-up scan at the original high repetition rate, thereby producing an output time signal identical with the original fine structure signal when there is no motion in the televised scene. This reconverted signal 30 is then added (in summation amplifier 36) to the received coarse field information to form a complete video signal 37 once more, which signal can be used to reproduce the television image in the usual way.

Thus, as a result of the operations on the original video signal, a still picture is reproduced with the normal quality using only one-fifth the normally required transmission band width if the sample values set out above are used. Nevertheless, a major portion (80 per cent in the specimen arrangement described) of the original information capacity has been discarded in the storage operations on the fine structure signal and, when there is motion in the pictorial subject, this discarded information causes a lack of register between the coarse and the fine structure, since the low-frequency picture content is brought up-to-date more frequently than the high-frequency components. It is readily seen that in the arrangement of the invention utilizing electrical filters which operate on a conventional video signal, this imperfect register occurs only between the coarse and fine fields associated with vertical lines of edges, whereas in the arrangement employing coarse and fine image dissector tubes, both horizontal and vertical edges are subject to this difficulty since there is no fine structure information (in either direction) in the coarse signal.

Therefore, in accordance with the invention in all its embodiments, an automatic gain-control arrangement can be used to attenuate the fine field when it is badly out of register. And because an observer tolerates less sharpness in the portrayal of a moving object than in that of a stationary one, as discussed above, this reduction in detail does not appreciably derogate from the acceptability to the observer of a televised scene in which the detail of moving objects has been partially deleted by such a gain-control arrangement.

The utility of and the functioning of a gain-control arrangement to accomplish the desired attenuation are illustrated by Figs. 4 and 5.

In Fig. 4, the responses of various parts of the system to a narrow vertical subject line are indicated, and Fig. 5 depicts an embodiment of the invention employing gain-control of the fine detail signal. The illustrations are of the embodiment of the invention in which separation is effected by the operation of electrical filters, but it is to be understood that completely analogous illustrations are applicable to the camera tube embodiment and the application of a similar gain-control arrangement to the camera tube embodiment is clearly within the scope of the invention.

Referring now to Fig. 4, the area under the low-pass component A is the same as that under the signal video pulse I. The pulse output B of the high-pass filter consists of a main positive lobe flanked by a pair of negative lobes, the net area being zero. After the pulse B has been stored and then slowly rescanned at the transmitting point, the resulting pulse B′ has the same shape as B but is lengthened in duration. The complementary storage processes at the receiving point recover the original pulse form B. If there is no horizontal motion of the test line, the pulse is centered on the received pulse A so that the sum yields the original video pulse form.

When the test line is moved rapidly in a horizontal direction, the received pulse B is shifted relative to pulse A, yielding an unsymmetrical total wave form. It is the function of the system shown in Fig. 5 to obviate the objectionable effects of this transient displacement of the high-frequency image field. At the receiver, the low-pass signal 22 is compared in a differential mixer 25 with a version of itself 23 delayed by a fixed period of time, which period can be conveniently chosen as one frame time. A storage tube or other delay device can be used as the means 24 for effecting the delay. This difference signal in the output circuit of mixer 25 is put through a full-wave rectifier 27 in order to obtain its absolute magnitude. Then the rectified difference signal 28 is applied to control the gain of an amplifier 29 which transmits the recovered high-pass signal 30; the control being such that a large difference signal tends to reduce the amplifier gain sharply. Thus, when there is an appreciable change in any given area of the subject during a frame period, the high-frequency signal is attenuated for that area and, as a result, the high-frequency picture field is transmitted freely only where it is in close register with the low-frequency field.

In all the embodiments of the invention, better results can be obtained by inserting some time delay in the coarse signal path to match the delay in the fine signal path due to the storage processes. It can be shown that the average delay in the fine signal path due to the sequence of storage processes is approximately $$\frac{1}{2n_1}$$

seconds at the receiver, where $n_1$ is the number of frames per second, i. e., the reduced repetition rate, of the pick-up scan of the storage tube at the transmitter. This delay can theoretically be obtained by the use of any of the ordinary forms of straightforward delay networks which are well known in the art, but the most practical means, in view of the large amount of delay required, is a storage tube similar to that discussed above.

Fig. 6 depicts the same embodiment of the invention shown in Fig. 1 in which separation is effected by electrical filters except that the insertion of time delay in the coarse signal path is also shown in Fig. 6. In addition, certain details of synchronization of the system which are equally applicable to the other embodiments of the invention but which, for simplicity in exposition, are omitted in the earlier figures are illustrated in Fig. 6.

For the processing of the "high-pass" signal 51 at the transmitter the synchronizing signals 52 are stripped off the incoming video signal 50 by the device 68 of any well-known type and used to control the recording scan 54 of the storage tube 53 at $n$ frames per second. A local "free-running" synchronizing signal generator 55 of any suitable form is used to control the pick-up scan at $n_1$ frames per second ($n_1$ being less than $n$). The necessary blanking and synchronizing signals 56 are also taken from this local synchronizing signal generator and are mixed with the outgoing high-pass signal 57 in the unit 58 which has, for convenience and simplicity, been labeled "video preparing and transmitting equipment." At the receiver, the reduced repetition rate high-pass signal 59 is recorded on a storage tube 60 at $n_1$ frames per second, the synchronizing signals 63 for controlling the recording scan 66 being derived from the incoming signal. This is done by "sync. stripper" circuits 61 which like the corresponding "stripper" circuits 68 of the transmitter are well known in the electronic art and, in accordance with the invention, may comprise conventional clipper tubes or other circuits of common design which are adapted to eliminate those portions of a given signal which are above or below, as the case may be, a predetermined amplitude. In recovering the high-pass signal 71 from this storage tube, the scanning signal 76 must be synchronized with the incoming low-pass signal 70. This low-pass signal is delayed by about $$\frac{1}{2n_1}$$

by a delaying means 69 at the receiver (approximately the average delay in the high-pass signal due to the sequence of storage operations, as discussed above) and then its synchronizing signals are stripped off by "stripper" circuits 66 similar to strippers 61 and 68 previously mentioned.

Because of the low-pass filter at the transmitter, these synchronizing signals do not have very steep edges and this is especially true in the case where considerable band-width reduction is being sought. In that case, the upper frequency limit of the pass band of the low-pass filter is a very small fraction of the normal top video frequency of the system and the low-pass filter cannot, therefore, transmit sharply defined pulses. Therefore, it is in accordance with the invention to use these "fuzzy" synchronizing signals 78 to control a standard synchronizing signal generator 64 ($n$ frames per second) at the receiver, through a "flywheel" or automatic frequency control type of locking circuit 79, such as is well known in standard television receiver practice. One such circuit is the well-known "Syncro-lok" circuit. The output 80 of this synchronizing signal generator is used to control the pick-up scan 76 of storage tube 60 to reconvert the stored high-pass signal 59 to an $n$ frame per second time signal 71. Finally, the recovered high-pass signal is added to the delayed low-pass signal 77 to reconstitute the complete video signal 75. Synchronizing and blanking signals 74 are taken from the receiver synchronizing signal generator 64 and mixed with the recombined or total video signal 75 in the unit 73 which, for simplicity, has been labeled "video preparing and transmitting equipment" and which contains conventional television modulating and transmitting circuits. The resulting signal 81 is now back in the proper form for normal propagation to individual receivers.

It is to be understood that the above-described arrangements are illustrative of the application of the principles of the invention. Numerous other arrangements may be devised by those skilled in the art without departing from the spirit and scope of the invention.

What is claimed is:

1. A television system comprising means for forming separate signals respectively representative of coarse and fine components of a television image, means for transmitting said coarse components at one repetition rate, means for transmitting said fine components at another, reduced, repetition rate, means at the receiving station to increase the repetition rate of said modified fine components, and means to recombine said coarse and restored-rate fine components into a complete video signal.

2. A television system to transmit television signals comprising coarse and fine detail components, said system comprising means for separating from each other said coarse and fine components, said separating means comprising complementary high-pass and low-pass electrical filters such that said low-pass filter is adapted to transmit freely only those frequencies less than a frequency $f_c$ and the high-pass filter is adapted to transmit freely only those frequencies greater than said frequency $f_c$, where $f_c$ is a predetermined fraction of the maximum frequency to be found in the video signal, means for transmitting said coarse components at one repetition rate, means for transmitting said fine components at another, reduced, repetition rate, means at the receiving station to increase the repetition rate of said modified fine components, and means to recombine said coarse and restored-rate fine components into a complete video signal.

3. A television system comprising means for forming separate signals respectively representative of coarse and fine components of a television image, means for transmitting said coarse components at one repetition rate, means for transmitting said fine components at another, reduced, repetition rate, means at the receiving station to increase the repetition rate of said modified fine components, means to reduce the amplitude of said modified fine components, and means to recombine said coarse and said restored-rate and amplitude-reduced fine components into a complete video signal.

4. A television system comprising means for forming separate signals respectively representative of coarse and fine components of a television image, means for transmitting said coarse components at one repetition rate, means for transmitting said fine components at another, reduced, repetition rate, means at the receiving station to increase the repetition rate of said modified fine components, means to control the amplitude of said modified fine components, said last-mentioned means comprising means for comparing said coarse component signal and a coarse component signal delayed by one frame time, and means for utilizing the difference signal resulting from said comparison to control the gain of an amplifier transmitting said modified fine components, and means to recombine said coarse and said restored-rate and amplitude-controlled fine components into a complete video signal.

5. A television system comprising means for forming separate signals respectively representative of coarse and fine components of a television image, means for transmitting said coarse components at one repetition rate, means for transmitting said fine components at another, reduced, repetition rate, said means for transmitting the fine components at a reduced repetition rate comprising a storage tube device including a recording mosaic, a recording beam, and a pick-up beam, in which the recording beam is moved over the recording mosaic in a certain geometrical pattern and at a certain repetition rate and the pick-up beam is moved in the same geometrical pattern but at a lower repetition rate, means at the receiving station to increase the repetition rate of said modified fine components, and means to recombine said coarse and restored-rate fine components into a complete video signal.

6. A television system comprising means for forming separate signals respectively representative of coarse and fine components of a television image, means for transmitting said coarse components at one repetition rate, means for transmitting said fine components at another, reduced, repetition rate, means at the receiving station to increase the repetition rate of said modified fine components, said means for increasing the repetition rate of said modified fine components comprising a storage tube device including a recording mosaic, a recording beam, and a pick-up beam, in which said recording beam is moved over said recording mosaic in a certain geometrical pattern and at a certain repetition rate, and said pick-up beam is moved in the same geometrical pattern but at a greater repetition rate, and means to recombine said coarse and restored-rate fine components into a complete video signal.

7. A television system comprising means for forming separate signals respectively representative of coarse and fine components of a television image, means for transmitting said coarse components at one repetition rate, means for transmitting said fine components at another, reduced, repetition rate, means at the receiving station to increase the repetition rate of said modified fine components, means to cause time delay of the coarse component signals to match the average delay produced by the reduction of repetition rate of the fine components, and means to combine said delayed coarse and restored-rate fine components into a complete video signal.

8. Apparatus for transmitting television signals comprising coarse and fine detail components comprising means for separating from each other said coarse and fine components, means for transmitting said coarse components at one repetition rate, means for reducing the repetition rate of said fine components to another repetition rate, means for transmitting said fine components at said reduced repetition rate, means for increasing at the receiving station the repetition rate of said modified fine components, and means for recombining said coarse and restored-rate fine components into a complete video signal.

9. A television system to transmit television signals comprising coarse and fine detail components of a television image, comprising means for separating from each other said coarse and fine components, said separating means comprising two image dissector tubes, one of which is adapted to transmit only fine detailed components and the other is adapted to transmit only coarse components of the video information, means for transmitting said coarse components at one repetition rate, means for transmitting said fine components at another reduced repetition rate, means at the receiving station to increase the repetition rate of said modified fine components, and means to recombine said coarse and restored-rate fine components into a complete video signal.

ROBERT E. GRAHAM.

REFERENCES CITED

The following references are of record in the file of this patent:

UNITED STATES PATENTS

| Number | Name | Date |
|---|---|---|
| 1,769,920 | Gray | July 8, 1930 |
| 2,293,899 | Hanson | Aug. 25, 1942 |
| 2,381,901 | Goldsmith | Aug. 14, 1945 |
| 2,381,902 | Goldsmith | Aug. 14, 1945 |
| 2,454,652 | Iams | Nov. 23, 1948 |

FOREIGN PATENTS

| Number | Country | Date |
|---|---|---|
| 266,591 | Great Britain | Jan. 3, 1927 |
| 324,399 | Great Britain | Jan. 27, 1930 |
| 906,982 | France | Nov. 12, 1943 |
| 928,783 | France | June 16, 1947 |
| 932,934 | France | Dec. 17, 1947 |

OTHER REFERENCES

Six Megacycle Compatible Color Television System, published by RCA, Sept. 1949, pages 2 and 11.